United States Patent [19]
Toyoda

[11] 3,896,456
[45] July 22, 1975

[54] ELECTRONIC SHUTTER WITH MEMORY FUNCTION
[75] Inventor: Kenji Toyoda, Tokyo, Japan
[73] Assignee: Nippon Kogaku K.K., Tokyo, Japan
[22] Filed: Apr. 2, 1974
[21] Appl. No.: 457,179

[30] Foreign Application Priority Data
Apr. 10, 1973 Japan.............................. 48-42902

[52] U.S. Cl.................................... 354/24; 354/51
[51] Int. Cl. ........................................... G03b 7/08
[58] Field of Search................................. 354/24, 51

[56] References Cited
UNITED STATES PATENTS
3,670,637  6/1972  Mori et al............................. 354/24
3,731,603  5/1973  Ono et al.............................. 354/24

*Primary Examiner*—Joseph F. Peters, Jr.
*Attorney, Agent, or Firm*—Fitzpatrick, Cella, Harper & Scinto

[57] ABSTRACT

An electronic shutter device for controlling exposure time in a camera includes a first circuit having a photocell for intercepting the light passing through a camera lens, a second circuit having a variable resistor which is set in response to at least an f-value or a film speed, a memory capacitor, a switch interconnected between the output terminal of the first circuit and the capacitor and adapted to be opened immediately before the incidence of light to the photocell is interrupted in response to the shutter release operation:

a differential amplifier with a first input terminal connected to the junction between the capacitor and the switch and with a second input terminal connected to the output terminal of the second circuit; and a control circuit adapted automatically to control an exposure time in response to the output of said differential amplifier. The capacitor is connected between said first and second input terminals of the differential amplifier so that the capacitor may store the difference between the output voltage of the first and second circuits.

2 Claims, 5 Drawing Figures

B: BRIGHTNESS OF AN OBJECT

A: f-VALUE OF A CAMERA LENS
S: FILM SPEED

ELECTRONIC SHUTTER WITH MEMORY FUNCTION

BACKGROUND OF THE INVENTION

1. Field of the Invention

The present invention relates to an improvement in an electronic shutter with a memory.

2. Description of the Prior Art

There has been known in the art an electronic shutter of the type in which the output of a photocell, which varies in response to the intensity of light from an object passing through a camera lens, is stored in terms of a voltage across a capacitor and an exposure time is automatically controlled based upon the difference between the stored voltage and an output representing an exposure factor except a shutter speed. However, the electronic shutter of the type described has encountered the following difficulties:

1. a stored voltage across a capacitor changes due to leakage current and/or absorption current to be described in detail hereinafter; and
2. a correct exposure time cannot be attained because of variation in the output representing the exposure factor except a shutter speed, by variations in power supply voltage; and variation in the ambient temperature after the output representing the intensity of light from an object has been stored.

SUMMARY OF THE INVENTION

I have conceived, and contribute by the present invention, apparatus of the class described by which I am able to overcome the foregoing difficulties encountered in conventional electronic shutters with a memory function, and to provide an electronic shutter by which I control the exposure time with a higher degree of accuracy by minimizing leakage and/or absorption current of a storage capacitor, and by eliminating influences due to temperature variations.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
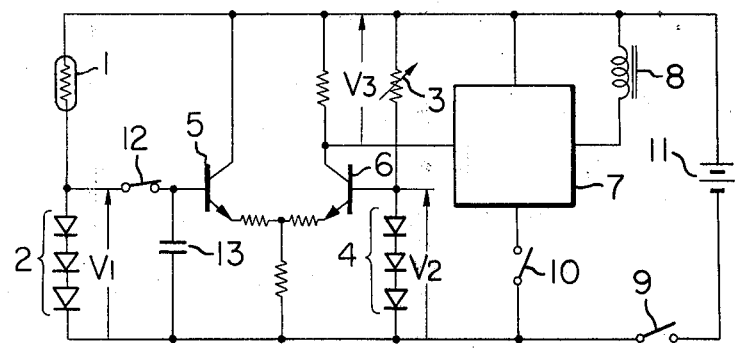
FIG. 1 is a circuit diagram of the electronic shutter device according to the prior art.

Prior to the description of the preferred embodiments of the present invention, I shall briefly describe the prior art electronic shutter shown in FIG. 1 in order specifically to point out the difficulties attendant thereon.

Figure 4:
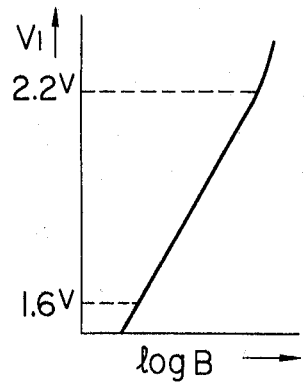
FIG. 4 is a graph illustrating the brightness of a subject versus the output of the electronic shutter circuit.

In FIG. 1, a photocell 1 such as a CdS interposed in the optical path of a camera lens is connected in series to series-connected diodes 2 so that the output voltage V1 is in logarithmic proportion to the intensity of light reaching the photocell from an object. As shown in FIG. 4, the output voltage V1 varies over a range between 1.6 and 2.2 volts in response to the intensity of the light and depending upon the properties of the photocell 1 and the diodes 2.

Figure 5:
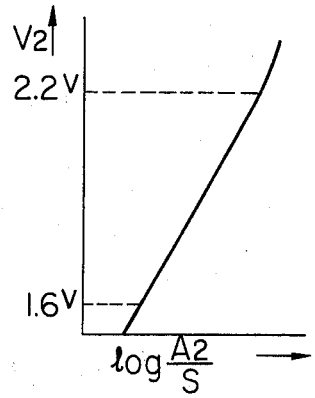
FIG. 5 is a graph illustrating the relation between the ratio of an f-number value of a camera lens to a film speed and the output of the electronic shutter circuit.

A variable resistor 3 which is connected in series to series-connected diodes 4 is adapted to change its resistance in response to at least one of the exposure factors such as an f-value of a camera lens and a film speed, so that the output voltage V2 in logarithmic proportion to an f-value or film speed may be developed across the diodes 4. The output voltage V2 varies over a range (see FIG. 5) between 1.6 and 2.2 volts depending upon the properties of the variable resistor 3 and the diodes 4.

The two output voltages V1 and V2 are fed into a differential amplifier consisting of transistors 5 and 6 so that the output voltage V3 in proportion to the difference between the output voltages V1 and V2 may be applied to an input terminal of a control circuit 7. The output voltage V3 of the differential amplifier is in logarithmic proportion to an optimum exposure time.

When a first switch 9 is closed, current is supplied from a power source 11.

When a shutter release button is depressed, a memory switch 12 is opened in response to the actuation of a reflecting mirror drive mechanism or the like of a single-lens reflex camera immediately before the light beam is interrupted to be incident upon the photocell 1 so that the output V1 is stored as a voltage across a memory capacitor 13. Thereafter, a second switch 10 is closed so that current flows into the control circuit 7 and an electromagnet 8. A shutter is opened and is prevented from closing by the energized electromagnet 8.

The control circuit 7 includes a logarithmic expansion circuit or a circuit adapted to develop a voltage in logarithmic proportion to a time elapsed after the shutter has been opened. The control circuit 7 interrupts the supply of current to the electromagnet 8 after a time interval corresponding to the output voltage V3 of the differential amplifier so that the closing of the shutter is started. Thus, the exposure is completed.

In the conventional electronic shutter of the type described above, the voltage across the capacitor 13 decreases gradually after the memory switch 12 is opened because of leakage current so that a correct exposure time cannot be attained. In addition to the leakage current, an absorption current flows into a tantalum electrolytic capacitor which is generally used as a storage capacitor. The absorption current is a current which charges a storage battery which the storage capacitor has as an electrically equivalent circuit therein when the voltage across the capacitor changes suddenly. The absorption current disappears a predetermined time after the sudden change in voltage across the capacitor occurs. Therefore, when the shutter release button is depressed immediately after the first switch 9 is closed, the storage of a precise or current output voltage V1 cannot be attained because of the absorption current, and thus results in error in the exposure time.

Furthermore, when the second switch 10 is closed to supply the current to the electromagnet 8 after the switch 12 is opened, the voltage of the power supply 11 drops so that the output voltage V2 changes. Moreover, when the temperature of the circuit rises due to the increase in current flowing through the circuit, the output voltage V2 also changes. However, the stored output voltage V1 is not effected at all. Therefore, the change in output voltage V2 leads to an erratic exposure time.

Figure 2:
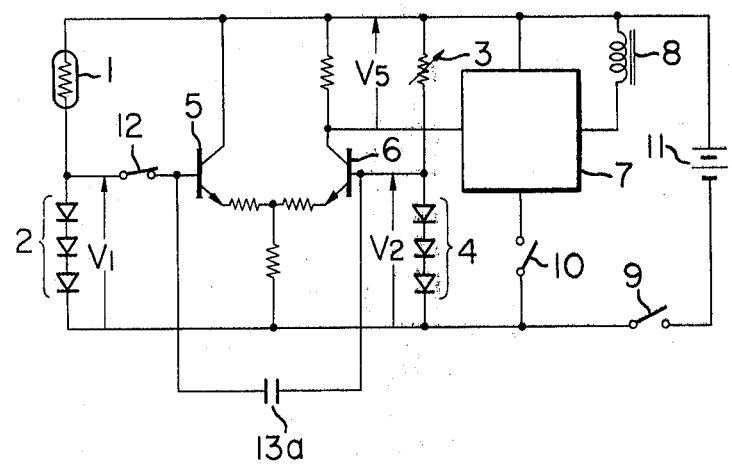
FIGS. 2 and 3 are diagrams of first and second embodiments of an electronic shutter in accordance with the present invention.

Referring now to FIG. 2, there is shown a first embodiment of the present invention wherein one terminal of a memory capacitor 13a is connected to the junction between the memory switch 12 and the base of the transistor 5 while the other terminal is connected to the base of the transistor 6. Except for the above arrangement, the second embodiment is substantially similar in construction to the prior art shown in FIG. 1. However, since the memory capacitor 13a is connected in the manner described above, the voltage across the capacitor 13a equals the difference between the output voltages V1 and V2 and is stored when the memory switch 12 is opened. As will be appreciated from FIGS. 4 and 5, the difference between the output voltages V1 and V2 is +0.6 volts at the maximum and −0.6 volts at the minimum. The leakage and absorption current of the capacitor are largely dependent upon the voltage across the capacitor, and are suddenly decreased in magnitude when the voltage across the capacitor is decreased. In the conventional electronic shutter circuit the maximum voltage across the memory capacitor was 2.2 volts, but according to the present invention it is only 0.6 volts. Therefore, it is seen that in the present embodiment, both leakage and absorption currents of the memory capacitor are considerably decreased relatively to those in the circuit if FIG. 1 so that their effects upon an exposure time are negligible.

Since the voltage across the memory capacitor 13a is applied to two input terminals of the differential amplifier, it will not change at all even when the output voltage V2 varies due to variations in power supply voltage and temperature after the second switch 10 is closed. Therefore, the inputs to the differential amplifier will not change due to variations in power supply voltage and ambient temperature. Thus, a correct exposure time is attained.

Figure 3:
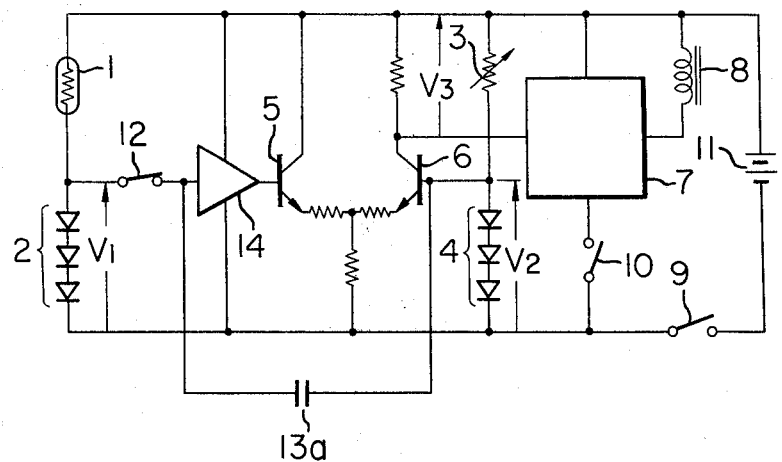

The second embodiment shown in FIG. 3 is substantially similar in construction to the first embodiment shown in FIG. 2 except that an impedance changing circuit 14 is interconnected between the base of the transistor 5 and the memory capacitor 13a.

The circuit has a relatively high input impedance and a relatively low output impedance, and the input voltage equals the output voltage. That is, the amplification factor is unity. The circuit 14 may be a source follower of a FET transistor, for instance. Because of the above arrangement, the effect of the input current to the differential amplifier upon the voltage across the memory capacitor 13a is minimized, and the voltage across the memory capacitor may be held for a long time.

As described hereinbefore, according to the present invention, the effects of variations in power supply voltage and ambient temperature are eliminated by a simple arrangement, and not only a short exposure time but also a long exposure time may be attained with a higher degree of accuracy.

I believe that the construction and operation of my novel electronic shutter will now be understood and that the advantages thereof will be fully appreciated by those persons skilled in the art.

I claim:

1. In an electronic shutter circuit having:

a light measuring circuit for producing an output voltage in logarithmic proportion to the intensity of light passed from an object through an objective lens;

a second circuit means for producing an output voltage in logarithmic proportion to at least one exposure factor;

a memory capacitor for storing a voltage related to said output voltage of said light measuring circuit;

a memory switch for connecting said memory capacitor to said measuring circuit, and means for opening said memory switch before the shutter is opened;

a differential amplifier including a first input terminal connected to the output terminal of said measuring circuit through said memory switch and a second input terminal connected to the output terminal of said second circuit;

control circuit means for controlling an exposure time in response to the output of said differential amplifier, said control circuit means including a magnet and a further switch for connecting said magnet to a power source, and means for closing said further switch after said memory switch is opened, said capacitor being connected between said first and second input terminals of said differential amplifier, whereby said memory capacitor stores the difference between the output voltages of said measuring and second circuits and after said memory switch is opened the output voltage of said differential amplifier is determined solely by the voltage stored in said memory capacitor.

2. An electronic shutter as defined in claim 1 wherein said differential amplifier includes an impedance changing circuit connected to the input thereof so as to increase the input impedance thereof.

* * * * *